(12) United States Patent
Bellich et al.

(10) Patent No.: US 6,983,673 B2
(45) Date of Patent: Jan. 10, 2006

(54) TRANSFER CASE BUSHING

(75) Inventors: Peter J. Bellich, Utica, MI (US); Bryan D. McIntyre, St. Clair Shores, MI (US); Ray F. Hamilton, Novi, MI (US); John H. Price, Muncie, IN (US); David R. Weilant, Muncie, IN (US); Ivan C. Poor, Muncie, IN (US); Jim Sells, Selma, IN (US)

(73) Assignee: BorgWarner Inc., Auburn Hills, MI (US)

( * ) Notice: Subject to any disclaimer, the term of this patent is extended or adjusted under 35 U.S.C. 154(b) by 13 days.

(21) Appl. No.: 10/377,021

(22) Filed: Feb. 28, 2003

(65) Prior Publication Data

US 2004/0168845 A1 Sep. 2, 2004

(51) Int. Cl.
*F16H 57/02* (2006.01)

(52) U.S. Cl. .................... 74/606 R; 464/162
(58) Field of Classification Search ............. 464/134, 464/162, 170, 178; 74/606 R; 180/233, 247; 384/276, 291, 292, 295, 906
See application file for complete search history.

(56) References Cited

U.S. PATENT DOCUMENTS

| 3,339,270 | A | * | 9/1967 | Walton et al. ......... 74/606 R X |
| 3,439,586 | A | * | 4/1969 | Holtan ................. 384/276 X |
| 3,491,555 | A | * | 1/1970 | Arndt .................... 464/162 |
| 3,964,344 | A | * | 6/1976 | Horvath et al. ....... 74/606 R X |
| 3,965,880 | A | * | 6/1976 | Michael ............... 384/292 X |
| 4,623,810 | A | * | 11/1986 | Smith |
| 5,782,142 | A | * | 7/1998 | Abend et al. ......... 74/606 R X |
| 5,887,982 | A | * | 3/1999 | Wilcher ............... 384/295 X |
| 6,348,002 | B1 | * | 2/2002 | Breese ................. 464/162 X |
| 6,374,700 | B1 | * | 4/2002 | Jarzyna ................ 74/606 R |

* cited by examiner

*Primary Examiner*—Greg Binda
(74) *Attorney, Agent, or Firm*—Warn, Hoffmann, Miller & Lalone, P.C.; Greg Dziegielewski

(57) ABSTRACT

A transfer case for AWD/4WD vehicle that employs a bushing positioned within a transfer case housing. The bushing is formed to the housing when the housing is cast. The bushing includes one or more axial notches formed in an outer surface of the bushing that fill with the housing metal during the casting process that prevents the bushing from rotating in response to a load from a slip yoke. A helical groove is formed in the inner surface of the bushing and a slot is formed through a housing wall along the bushing that allows lubricant from within the housing to flow through the bushing.

14 Claims, 4 Drawing Sheets

TRANSFER CASE BUSHING

BACKGROUND OF THE INVENTION

1. Field of the Invention

This invention relates generally to a transfer case for an all-wheel drive (AWD)/four-wheel drive (4WD) vehicle and, more particularly, to a transfer case for an AWD/4WD vehicle that employs a rear output shaft bushing that is cast with the transfer case housing, where the bushing incorporates a spiral groove for allowing lubricant flow therethrough.

2. Discussion of the Related Art

Various sport utility vehicles (SUV), off-road vehicles, four-wheel drive vehicles, etc. are equipped with drive modes that allow the vehicle to be driven in one or more of two-wheel drive high, four-wheel drive high, four-wheel drive low and AWD. Typically, these types of vehicles employ transfer cases that distribute the drive power received from an output shaft of the vehicle's transmission. Particularly, the output shaft of the transmission is coupled to an input shaft of the transfer case that distributes drive power to a front output shaft that is coupled to a front drive shaft that drives the vehicle's front wheels and a rear output shaft that is coupled to a rear drive shaft that drives the vehicle's rear wheels. Known transfer cases have employed various types of couplings, such as viscous couplings, electromagnetic clutches, positionable spur gears, etc., that allow the drive power from the transmission to be distributed to the front and rear drive shafts to provide the various drive modes.

The rear output shaft of the transfer case is coupled to the rear drive shaft by a slip yoke. The rear drive shaft is coupled to a rear axle of the vehicle, which is mounted to a vehicle suspension system. As the vehicle travels, the rear axle moves up and down in response to road conditions. As the rear axle moves up and down, the slip yoke slides on the rear output shaft so that the suspension load is not significantly transferred thereto. A bushing is typically employed in the opening of the transfer case housing through which the rear output shaft extends. The slip yoke is supported and rotates within the bushing, and is able to reciprocate therein along the axis of the output shaft. This allows the rear drive shaft to slide relative to the rear output shaft in response to rough driving conditions.

The housing of the transfer case is typically cast in two or more pieces and then bolted together. For example, a portion of the transfer case housing is sometimes cast as a separate cover housing and extension housing. An opening through which the rear output shaft extends is then machined into the appropriate housing piece to accept the bushing. The bushing is then pressed into the housing piece in a friction engagement before the housing pieces are bolted together. An inner surface of the bushing is then machined so that it has an internal diameter suitable for the outer diameter of the slip yoke.

It is desirable to limit the number of housing pieces to reduce costs and assembly time. However, if the housing piece to which the bushing is mounted is too large, then it becomes too difficult to machine the opening in the transfer case that accepts the bushing. Further, the bushing has a tendency to spin out of the opening in response to the load applied thereto from the slip yoke during operation. Also, the load from the slip yoke significantly increases the temperature of the bushing, that may lead to part failure of the bushing and/or rear output shaft.

SUMMARY OF THE INVENTION

In accordance with the teachings of the present invention, a transfer case for an AWD/4WD vehicle is disclosed that employs a bushing positioned within a housing of the transfer case. A slip yoke is inserted into the bushing and is rotatable therein. A rear drive shaft is rigidly coupled to the yoke. An output shaft of the transfer case is rigidly coupled to the yoke so that they rotate together and the yoke can slide in an axial direction relative to the output shaft. The bushing is formed to the housing when the housing is cast. The bushing includes one or more axial notches formed in an outer surface of the bushing that fill with housing metal during the casting process that prevent the bushing from rotating in response to the load from the slip yoke. A helical or spiral groove is formed in an inner surface of the bushing and a slot is formed through a housing wall along the bushing that allows lubricant from within the housing to flow through the groove.

Additional advantages and features of the present invention will become apparent to those skilled in the art from the following discussion and the accompanying drawings and claims.

DETAILED DESCRIPTION OF THE EMBODIMENTS

The following discussion of the embodiments of the invention directed to a transfer case for an AWD/4WD vehicle that includes a rear output shaft bushing is merely exemplary in nature, and is in no way intended to limit the invention or it's applications or uses.

Figure 1:
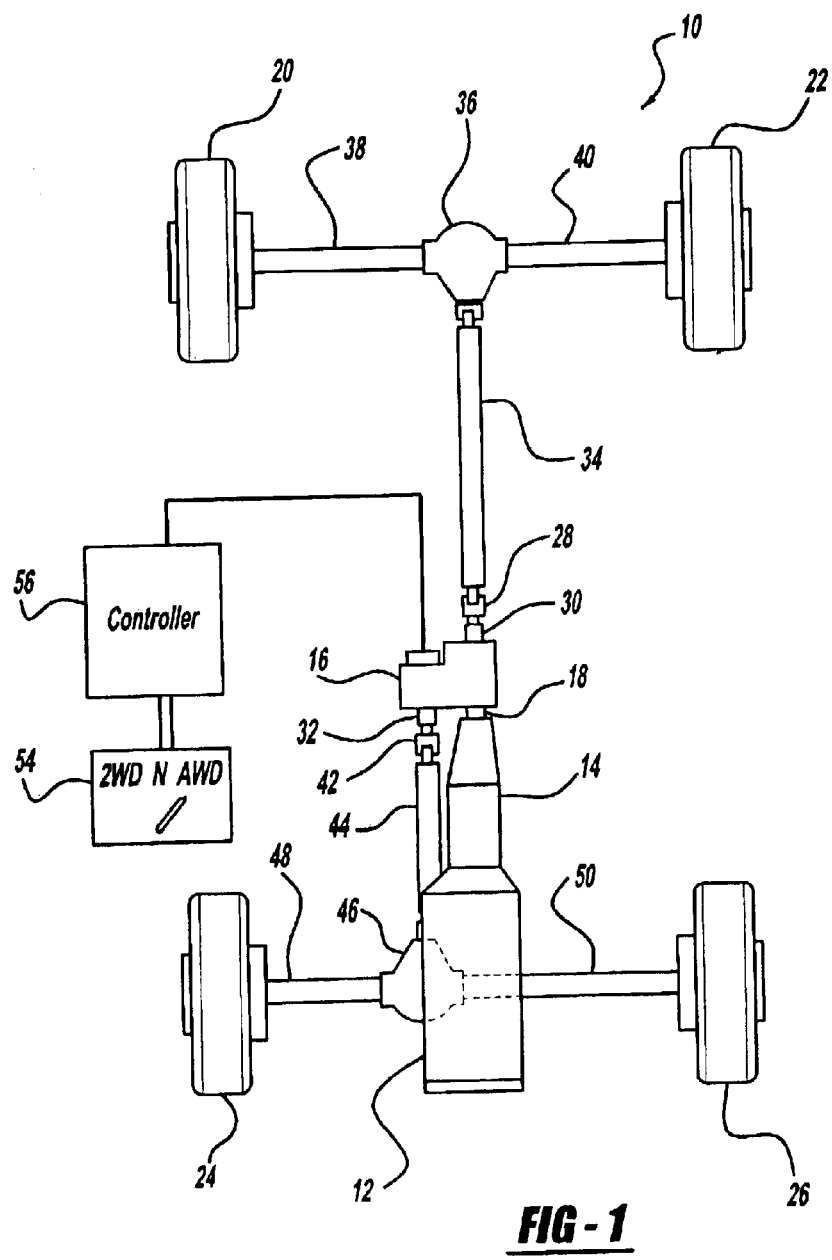
FIG. 1 is a plan view of the drive components of an AWD/4WD vehicle employing a transfer case, according to an embodiment of the present invention.

FIG. 1 is a plan view of the drive components of an AWD/4WD vehicle 10. The vehicle 10 includes an internal combustion engine 12 that provides the power to drive the vehicle 10, as is well understood in the art. A drive shaft (not shown) is rotated by the engine 12, and is coupled to a transmission 14 that converts the output power from the engine 12 to a selectively geared output. The operation of the engine 12 and the transmission 14 are well understood to those skilled in the art, and need not be discussed in detail here for a proper understanding of the invention.

The output drive power from the transmission 14 is provided to an input shaft 18 of a transfer case 16. The transfer case 16 selectively provides output drive power to a pair of rear wheels 20 and 22 and a pair of front wheels 24 and 26. In the two-wheel drive mode, drive power is only provided to the rear wheels 20 and 22. The transfer case 16 can also be shifted to neutral, where the transmission 12 is disengaged from the transfer case 16 and the wheels 20–26 can rotate freely for towing and the like.

The transfer case 16 includes a rear output shaft 30 and a front output shaft 32. The rear output shaft 30 is coupled to a rear drive shaft 34 by a slip yoke 28, and the rear drive shaft 34 is coupled to a rear differential 36. A first rear axle 38 is coupled at one end to the differential 36 and at an opposite end to the wheel 20. Likewise, a second rear axle 40 is coupled at one end to the differential 36 and at an opposite end to the wheel 22. The transfer case 16 provides output power on the rear output shaft 30, which provides rotational energy to the rear drive shaft 34. This rotational energy is transferred through the rear differential 36 and the axles 38 and 40 to the wheels 20 and 22 in a manner that is well understood in the art. The rear axles 38 and 40 are coupled to a vehicle suspension system (not shown) so that the axles 38 and 40 move up and down in response to the road conditions. The slip yoke 28 allows the rear drive shaft 34 to slide independent of the rear output shaft 30 so that this load is not significantly imparted to the transfer case 16.

The front output shaft 32 is coupled to a front drive shaft 44 by a slip yoke 42, and the drive shaft 44 is coupled to a front differential 46. A first front axle 48 is coupled at one end to the front differential 46 and at an opposite end to the wheel 24. Likewise, a second front axle 50 is coupled at one end to the front differential 46 and at an opposite end to the wheel 26. Drive energy on the front output shaft 32 drives the front drive shaft 44, and the front differential 46 transfers the drive energy to the wheels 24 and 26 through the front axles 48 and 50.

A switch 54, generally mounted on the dashboard of the vehicle 10, allows the vehicle operator to select the drive mode for two-wheel drive (2WD), AWD or neutral (N). The switch 54 provides a signal to a controller 56 indicating the drive mode selection. The controller 56 provides a control signal to the transfer case 16 to cause the transfer case 16 to make the shift to the desired drive mode, as will be discussed in detail below.

Figure 2:
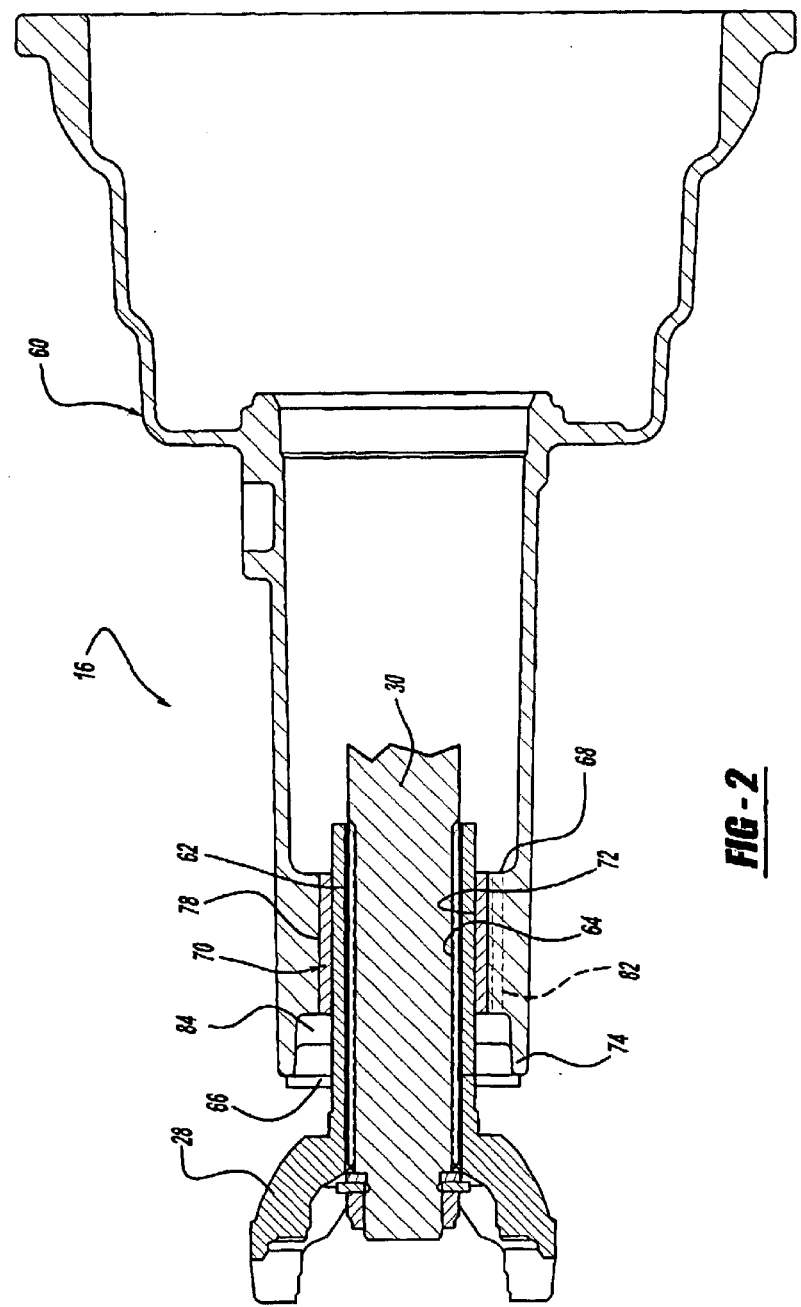
FIG. 2 is a cross-sectional view of part of the transfer case of the invention shown in FIG. 1.
Figure 3:
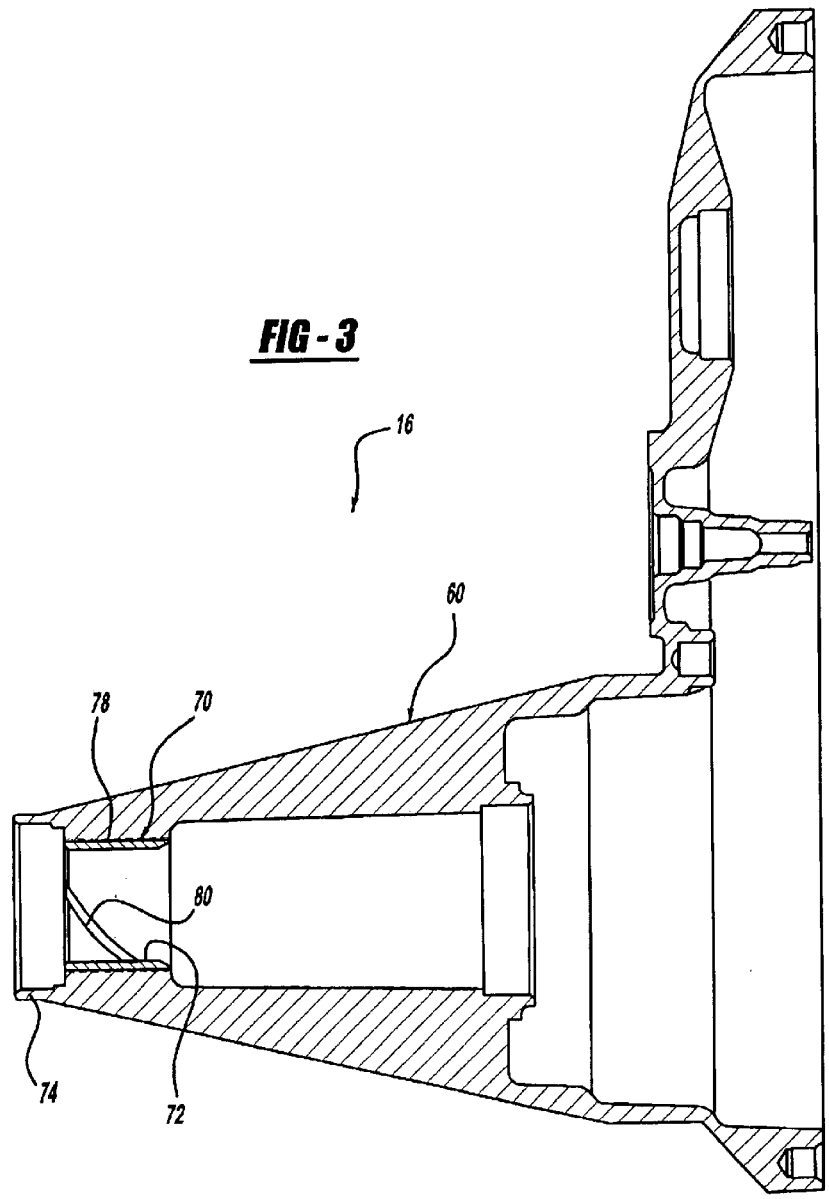
FIG. 3 is another cross-section view of part of the transfer case of the invention shown in FIG. 1.

FIGS. 2 and 3 are cross-sectional views of a housing portion 60 of the transfer case 16. The housing portion 60 is a cast metal member that would be bolted to another housing portion (not shown) to form the complete transfer case housing, as would be understood by those skilled in the art. The housing portions would include various seals, recesses, shoulders, flanges, bores, etc. that accept and position the various components and parts of the transfer case 16. The rear output shaft 30 is rotatably coupled to the input shaft 18 within the transfer case 16 by various gears, bearings, etc. (not shown) in any suitable manner that would be well understood to those skilled in the art. For example, the input shaft 18 may be coupled to the rear output shaft 30 by a planetary gear assembly (not shown) to provide the desired gear ratio between the input and output of the transfer case 16. Further, the rear output shaft 30 would be selectively coupled to the front output shaft 32 by a sprocket and chain assembly (not shown) to provide the drive power to the front output shaft 32 for the AWD/4WD drive mode. The coupling between the input shaft 18 and the rear output shaft 30 is not shown in any detail because any type of coupling system suitable for a transfer case can be employed.

As discussed above, the rear drive shaft 34 is mounted to the rear output shaft 30 by the slip yoke 28. The rear drive shaft 34 is rigidly mounted to the slip yoke 28, and the slip yoke 28 is rotatably and slidably mounted to the rear output shaft 30. Particularly, the rear output shaft 30 includes axial splines 62 on its outer surface and the yoke 28 includes cooperating splines 64 on its inner surface that allow the yoke 28 to slide axially relative to the output shaft 30. A seal 66 is mounted to an annular extension 74, as shown, to seal the housing portion 60 of the transfer case 16.

Figure 4:
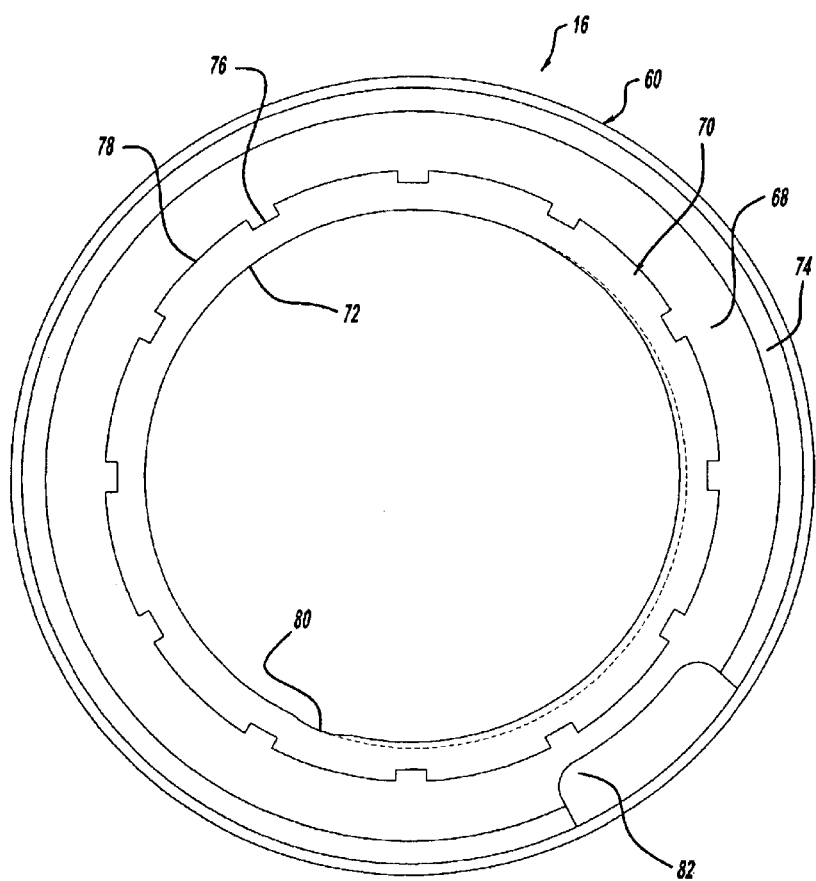
FIG. 4 is a rear-view of the transfer case showing a bushing employed therein.

According to the invention, the transfer case 16 includes a bushing 70 mounted to an annular shoulder portion 68 of the housing portion 60, as shown. FIG. 3 does not show the yoke 28 and the rear output shaft 30 for clarity purposes to better show the bushing 70. FIG. 4 is a rear-view of the housing portion 60 showing the bushing 70. As is well understood in the art, the slip yoke 28 rotates on an inner surface 72 of the bushing 70, and reciprocates in an axial direction within the bushing 70 in response to a rebound rear axle suspension system to provide a slip engagement with the rear output shaft 30. This allows the rear drive shaft 34 to move independent of the transfer case 16.

According to the invention, the bushing 70 is mounted to the shoulder portion 68 when the housing portion 60 is cast. Particularly, the bushing 70 is placed in the die cast, and the molten metal forming the housing portion 60 flows around it. In one embodiment, the bushing 70 is a sintered bronze bushing. However, this is by way of a non-limiting example, in that the bushing 70 can be made of any material suitable for the purposes described herein. By casting the bushing 70 with the housing portion 60, the opening in which the bushing 70 would normally be pressed into does not need to be machined, and the bushing 70 does not need to be later press fit into the housing portion 60, as was previously done in the art.

If the slip yoke 28 is cocked or angled relative to the axis of the bushing 70 in response to the up and down movement of the rear wheels 20 and 22, it can exert a significant load thereon. To prevent the bushing 70 from rotating within the shoulder 68 in response to the load, the bushing 70 includes a series of axial notches 76 formed in an outer surface 78 of the bushing 70 that receive molten metal when the housing portion 60 is cast. In this embodiment, there are twelve notches 76 symmetrically disposed around the outer surface 78 of the bushing 70. However, this is by way of a non-limiting example, in that any suitable number or size of the notches 76 can be provided within the scope of the present invention. The notches 76 prevent the bushing 70 from rotating within the housing portion 60 under the load from the yoke 28. Because the bushing 70 cannot spin within the housing portion 60, it will not push on the seal 66, causing failure of the transfer case 16.

Further, the load applied to the bushing 70 from the slip yoke 28 creates a significant heat build-up. According to the invention, a spiral or helical groove 80 is machined into the inner surface 72 of the bushing 70 after it is cast to the housing portion 60. Further, a slot 82 is machined through the shoulder 68 proximate the outer surface 78 of the bushing 70. The transfer case 16 is mounted to the vehicle 10 so that the rear portion of the transfer case 16 is slightly lower than the front portion of the transfer 16. This allows lubricating oil within the transfer case 16 to collect within the housing portion 60 proximate the bushing 70. The oil will flow through the slot 82 under gravity and into a chamber 84 between the seal 66 and the bushing 70. The oil will be pumped by the helical groove 80 as the yoke 28 and the output shaft 32 rotate back into the housing portion 60. Therefore, a constant supply of cooling and lubricating oil is provided to the space between the inner surface 72 of the bushing 70 and the yoke 28 to control the heat build-up. The level of the oil in the housing portion 60 is not high enough to cover the opening of the groove 80 into the housing portion 60.

The foregoing discussion describes merely exemplary embodiments of the present invention. One skilled in the art would readily recognize that various changes, modifications and variations can be made therein without departing from the spirit and scope of the invention as defined in the following claims.

What is claimed is:

1. A transfer case for a vehicle comprising:
   an outer housing, said outer housing being a cast member;
   an output shaft rotatably coupled to the housing; and
   a bushing disposed on an inner surface of the housing, said output shaft being operable to rotate within the bushing, said housing being formed to the bushing when the housing is cast so as to form an integral member;
   wherein the bushing includes at least one axial notch formed in an outer surface of the bushing, said notch accepting metal from the housing when it is cast and preventing the bushing from rotating;
   wherein the bushing includes a groove formed in an inner surface of the bushing.

2. The transfer case according to claim 1 wherein the bushing supports a slip yoke in a slip engagement, said output shaft being coupled to the slip yoke.

3. The transfer according to claim 2 wherein the output shaft is coupled to the slip yoke by mutually cooperating splines.

4. The transfer case according to claim 1 further comprising a slot extending through a housing wall proximate the bushing, said slot allowing lubricant within the transfer case to flow through the slot, wherein the lubricant is pumped back into the housing by the groove.

5. The transfer case according to claim 1 wherein the groove is a helical groove.

6. The transfer case according to claim 1 wherein the outer housing is an outer lower housing and the output shaft is a rear output shaft.

7. The transfer case according to claim 1 wherein the bushing is a sintered bronze bushing.

8. A transfer case for a vehicle comprising:
   a lower housing including an axial shoulder, said lower housing being a cast member;
   a rear output shaft rotatably coupled within the lower housing; and
   a bushing mounted to the shoulder within the lower housing, said bushing being formed to the housing when the housing is cast so as to form an integral member, wherein the bushing supports a slip yoke in a slip engagement that is rotatable therein, said output shaft being coupled to the slip yoke by mutually engaging splines so as to rotate therewith, and wherein the bushing includes a spiral groove formed in an inner surface of the bushing for pumping lubricating fluid therethrough;
   wherein the bushing includes at least one axial notch formed in an outer surface of the bushing, said notch accepting metal from the housing when it is cast and preventing the bushing from rotating.

9. The transfer case according to claim 8 wherein the shoulder includes a slot extending therethrough that allows the lubricating fluid within the transfer case to flow through the slot and be pumped back into the housing by the spiral groove.

10. The transfer case according to claim 8 wherein the bushing is a sintered bronze bushing.

11. A transfer case for a vehicle comprising:
    an outer housing, said outer housing including a housing wall having an opening extending therethrough;
    an output shaft rotatably coupled to the housing; and
    a bushing mounted to the housing proximate the housing wall, said bushing being formed to the housing when the housing is cast so as to form an integral member, said output shaft being operable to rotate within the bushing, said bushing including a spiral groove formed in an inner surface of the bushing, wherein the opening allows a lubricating fluid within the transfer case to flow therethrough, and the spiral groove allows the lubricating fluid to be pumped back into the transfer case;
    wherein the bushing includes at least one axial notch formed in an outer surface of the bushing, said notch accepting metal from the housing when it is cast and preventing the bushing from rotating.

12. The transfer case according to claim 11 wherein the bushing supports a slip yoke in a slip engagement, said output shaft being coupled to the slip yoke.

13. The transfer according to claim 11 wherein the output shaft is coupled to the slip yoke by mutually cooperating splines.

14. The transfer case according to claim 11 wherein the outer housing is an outer lower housing and the output shaft is a rear output shaft.

* * * * *